United States Patent
Okuyama et al.

(10) Patent No.: US 7,199,183 B2
(45) Date of Patent: Apr. 3, 2007

(54) PRIMER COMPOSITION AND BONDED STRUCTURE

(75) Inventors: Takahide Okuyama, Yamagata (JP); Takeshi Koyama, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/517,021

(22) PCT Filed: May 28, 2003

(86) PCT No.: PCT/US03/16598

§ 371 (c)(1),
(2), (4) Date: Dec. 6, 2004

(87) PCT Pub. No.: WO2004/003049

PCT Pub. Date: Jan. 8, 2004

(65) Prior Publication Data

US 2005/0245674 A1    Nov. 3, 2005

(30) Foreign Application Priority Data

Jun. 27, 2002    (JP)    ............................. 2002-187576

(51) Int. Cl.
*B32B 27/10* (2006.01)
*B32B 27/22* (2006.01)
*B32B 27/40* (2006.01)
*C08L 75/00* (2006.01)

(52) U.S. Cl. .................... 524/591; 428/412; 428/423.1
(58) Field of Classification Search ................ 524/591; 428/412, 423.1
See application file for complete search history.

(56) References Cited

U.S. PATENT DOCUMENTS

| 5,784,198 A | 7/1998 | Nagaoka |
| 5,859,122 A * | 1/1999 | Umeya ....................... 524/591 |
| 2002/0004553 A1 | 1/2002 | Temme et al. |

FOREIGN PATENT DOCUMENTS

| EP | 0 839 643 A1 | 5/1998 |
| JP | 7-052305 A | 2/1995 |
| JP | 7-084101 A | 3/1995 |
| JP | 2001-199195 A | 7/2001 |

* cited by examiner

*Primary Examiner*—Kriellion Sanders
(74) *Attorney, Agent, or Firm*—Colene H. Blank

(57) ABSTRACT

There is provided a primer composition capable of effectively enhancing anti-plasticizer property and water resistance even without curing of the primer layer, and a bonded structure. A primer composition forms a primer layer, containing a polymer, of a paint film formed by painting and drying on a surface to be painted; and a bonded structure includes: a base material, a primer layer containing a polymer sticking fast to the base material, and an adhesive sheet having an adhesive layer stuck fast to the primer layer. The polymer contains a polycarbonate polyurethane having a repeated unit derived from polycarbonate polyol in a molecule thereof.

16 Claims, No Drawings

PRIMER COMPOSITION AND BONDED STRUCTURE

FIELD OF THE INVENTION

The present invention relates to a primer composition and a bonded structure. More particularly, the present invention relates to a primer composition that can increase plasticizer resistance and water resistance of a primer layer without curing the primer layer to a bonded structure.

BACKGROUND OF THE INVENTION

In a bonded structure consisting of a base material and an adhesive sheet to be bonded to the base material, a primer layer is often provided between the base material and the adhesive sheet.

The primer layer is usually formed by coating a primer composition comprising a polymer (primer polymer). Two types of primer layers have conventionally been used. One is a cured primer layer formed by curing a coated primer composition and the other is an uncured primer layer that can be obtained by simply coating and drying a primer composition.

For example, the cured primer layer is disclosed in Japanese Patent Application Laid-open No. 7-52305. The Patent Application discloses an exterior decorative material for buildings, which is a bonded structure formed from a base material made from a mixture of an inorganic material (e.g., a calcium silicate material) and a fibrous material, a primer layer containing a cured resin formed on the surface of the base material, and a decorative sheet adhered to the surface of the primer layer. Typically, the decorative sheet has an adhesive layer that adheres to an exterior member via the adhesive layer. The cured resin is formed from a curable resin. Examples of curable resins that form the cured resin include an epoxy resin, polyisocyanate resin, urethane resin, and acrylic resin.

Such a cured primer layer is advantageous for increasing weather resistance, water resistance, plasticizer resistance, and the like. "Plasticizer resistance" means a plasticizer contained in a base material is prevented from moving to the adhesive layer of an adhesive sheet. If the plasticizer moves to the adhesive layer, the cohesive force of the adhesive layer is impaired. A decrease in the cohesive force induces a decrease in the adhesive force of the adhesive sheet with the base material (the primer layer) and may cause the adhesive sheet to release from the bonded structure during use. As an example, a base material has an outermost layer consisting of a plasticized resin layer that contains a resin and a plasticizer for the resin. Such a base material is used as an interior decorative board. The adhesive sheet (e.g. a decorative sheet) is used for repairing the interior decorative board, remodeling the inside and outside walls of buildings formed from the interior decorative board, and the like by adhering to the surface of the interior decorative board.

On the other hand, the uncured primer layer is disclosed in Japanese Patent Application Laid-open No. 2001-199195. The primer composition disclosed in the Patent Application contains an acrylic resin (a core-shell type acrylic emulsion resin) as a primer polymer.

In the cured primer, after applying the primer composition containing a curable resin to the surface of a base material, the primer layer must be aged for curing. A comparatively long time is required for completing the aging of the primer layer. In addition, in the case of a two-liquid type primer composition consisting of a main agent liquid and a curing agent liquid, these two liquids must be weighed and blended in a prescribed proportion at the production site. A one-liquid cured primer composition (moisture cured, for example) can be processed more simply than the two-liquid type. However, this type of primer is inconvenient due to difficulty in storing for a long period of time.

Some primer layers may be used without curing such as in the case when an acrylic resin is used (described above). However, such acrylic resin primer layer exhibits comparatively high affinity to plasticizers. Therefore, it is difficult to prevent a plasticizer from moving from the base material to the adhesive layer of an adhesive sheet when an acrylic primer is used without curing.

Alternatively, it is possible to use polyurethane as a primer polymer without curing the primer layer. However, such a primer layer has other types of problems associated with such a primer layer. Specifically, since polyester polyurethane is a fairly common polyurethane and is easily hydrolyzed, it is difficult to increase the water resistance. A decrease in the water resistance induces a decrease in the adhesive force of the adhesive sheet with the base material (the primer layer) and may cause the adhesive sheet to release from the bonded structure during use.

A primer layer formed from an aqueous primer containing a primer polymer dispersed in an aqueous medium particularly tends to decrease the water resistance. Increased water resistance is required for adhesive sheets used as an internal decorative sheet on the walls or floors of rooms where water is used such as a bathroom, kitchen, lavatory, and indoor pool.

SUMMARY OF THE INVENTION

The present invention has been achieved in view of the above problems in conventional technologies. Briefly, in one aspect, the present invention provides a primer composition and bonded structure that can produce a primer layer on the coated surface, in which the plasticizer resistance and water resistance can be increased without curing the primer layer.

Accordingly, the present invention provides a primer composition comprising a solvent and a polymer dispersed or dissolved in the solvent, the composition being applicable to a surface to form a primer layer when dried after the application, wherein the polymer is polycarbonate polyurethane having a recurring unit derived from polycarbonate polyol in the molecule.

In this primer composition, the solvent is preferably an aqueous solvent containing water and the polycarbonate polyurethane is dispersed in the aqueous solvent.

The present invention further provides a bonded structure comprising (1) a base material, (2) a primer layer comprising a polymer adhered to the base material, and (3) an adhesive sheet having an adhesive layer adhered to the primer layer, wherein the polymer is polycarbonate polyurethane having a recurring unit derived from polycarbonate polyol in the molecule.

The base material preferably has a resin and a plasticized resin layer containing the resin and a plasticizer for the resin, and the primer layer adhered to the plasticized resin layer.

DETAILED DESCRIPTION OF THE INVENTION

The primer polymer in the primer composition of the present invention contains polycarbonate polyol polyurethane, enabling a primer layer formed from the primer composition to have increased plasticizer resistance and water resistance without curing.

From the viewpoint of environmental protection, it is preferable that the solvent used for the primer composition is an aqueous solvent.

The primer composition of the present invention is particularly useful for forming bonded structures that are used in places where water is present. Specifically, the bonded structure comprises (1) a base material, (2) a primer layer containing a polymer adhered to said base material, and (3) an adhesive sheet having an adhesive layer adhered to the primer layer and is used in places where water is present.

The high hydrolysis resistance of the primer layer formed from the primer composition of the present invention is derived from the polycarbonate skeleton possessed by the polycarbonate polyol polyurethane in the molecule. The bonded structure having such a primer layer can effectively prevent the bonding strength (peeling resistance) between the base material and the adhesive sheet from decreasing, even if it is used in places where water is present.

In addition, the polycarbonate polyol polyurethane has excellent plasticizer resistance. Therefore, the plasticizer is effectively prevented from moving from the base material to the adhesive layer of an adhesive sheet when the base material has a plasticized resin layer. It is believed that such plasticizer resistance is based on the polycarbonate skeleton and polyurethane bond possessed by the polycarbonate polyol polyurethane, which results in high cohesion force. Such a cohesion force increases the intermolecular attractive force among polyurethane molecules, effectively preventing the plasticizer from immersing into the primer layer. Therefore, the bonded structure having such a primer layer effectively prevents the plasticizer from migrating from the base material to the adhesive sheet, whereby a decrease in the cohesive force of the adhesive layer is effectively prevented.

In addition, the primer layer formed from the primer composition of the present invention does not require curing after forming by applying the primer composition to obtain the above-described high performance. Therefore, if the primer composition contains substantially no curing agent, the process time can be shortened as compared to using a cured primer that requires a period of time to cure the primer layer. In addition, the primer composition of the present invention does not require the weighing and blending procedures that are required for two-liquid type primer composition, making it easy to form the bonded structure. Furthermore, the primer composition can be easily stored for a long period of time.

Primer Composition

The primer composition is a coating composition comprising a solvent and a polymer (primer polymer) dispersed or dissolved in the solvent. This coating composition forms a coating film where applied and dried. The primer polymer contains a polycarbonate polyurethane. When the solvent is an organic solvent, the primer polymer is usually dissolved in the solvent. When the solvent is an aqueous solvent, the primer polymer is usually dissolved in the solvent.

Methyl ethyl ketone, toluene, and ethyl acetate, for example, can be used as the organic solvent. Examples of the aqueous solvent include water and a mixture of water and alcohol. As examples of alcohol, alkylene glycol mono-alkyl ether esters such as dipropylene glycol monomethyl ether and 3-methyl-3-methoxybutyl acetate can be given. Aqueous primer compositions exhibit a smaller impact on environment. Therefore, an aqueous primer substantially consisting of water is ideal in view of ecology.

The nonvolatile component concentration of the primer composition is usually 5–50 mass %, preferably 10–40 mass %, and particularly preferably 15–30 mass %. If the nonvolatile component concentration is too small, it is difficult to form a coating (a primer layer) with a sufficient thickness and the drying speed may be retarded. In addition, when the surface to be coated is a vertically elongated object (with respect to the ground), the coated primer composition may run down the surface. On the contrary, if the nonvolatile component concentration is too high, application operation itself may be difficult or it may be difficult to produce a coating with a flat surface. If the coating surface is not flat and smooth, the bonded structure formed by applying an adhesive sheet on the coating may have impaired appearance.

The composition is usually coated using a brush, spray, roller, or the like. The primer layer is typically dried at a temperature of 10–120° C. for 1 minute to 10 hours. When the primer composition contains an aqueous medium, for example, the primer layer may be formed by drying in a room environment (usually 25° C., 65% RH) for 0.5–2 hours. The dry thickness of the primer layer is usually 1–200 µm, and preferably 2–100 µm.

The content of the primer polymer in the primer layer formed from the primer composition in the total primer layer is usually 70 mass % or more, preferably 80 mass % or more, and particularly preferably 90 mass % or more. If the content of the primer polymer is too small, ordinary bonding strength (peeling resistance of the adhesive sheet adhered to the primer layer), water resistance, and plasticizer resistance may be impaired.

The primer polymer may contain a polymer other than polycarbonate polyurethane. Such a polymer may be polystyrene, styrene-butadiene copolymer, polyamide, acrylic resin, polyurethane (polyether polyurethane and polycaprolactone polyurethane) other than the polycarbonate polyurethane, and the like. The content of the primer polymer in the primer layer formed from the primer composition in the total primer layer is usually 60 mass % or more, preferably 70 mass % or more, and particularly preferably 80 mass % or more. If the content of the polycarbonate polyurethane is too small, the water resistance and plasticizer resistance may be impaired.

Additives other than the primer polymers may be added to the primer composition insofar as the effect of the present invention is not adversely affected. Such additives may include a repellency preventive agent, thickener, anti-foaming agent, leveling agent, UV absorber, antioxidant, and the like. An additive such as a surfactant and the like having a hydrophilic functional group in the molecule may move to the surface of the primer layer (the adhering surface with the adhering sheet), resulting in a decrease in the water resistance of the primer layer. Therefore, it is desirable to limit the content of such a surfactant or use with a high molecular weight exhibiting low surface migration characteristics. The number average molecular weight of the surfactant is preferably 1,000–30,000. When a surfactant having a number average molecular weight of less than 1,000 is used, the amount should be preferable 5 mass % or less, and particularly preferably 3 mass % or less of the total mass of the primer layer.

The repellency preventive agent prevents the primer composition from being repelled when applied to the base material surface or the like and easily increases surface smoothness of the primer layer formed from a dry coating of the composition. In the case of an aqueous primer composition, a repellency preventive agent dispersible or soluble in an aqueous medium is preferably added. The repellency preventive agent is a polymer having a number average molecular weight usually of 1,000–30,000. The polymer has a hydrophobic main chain and side chains containing hydrophilic functional groups. Examples include water soluble polymers (or oligomers), water dispersible polymers (or oligomers), and high molecular weight surface active agents.

Examples of the main chain for such a compound with a comparatively high molecular weight include polyurethanes, acrylic polymers, and silicones. Typical acrylic polymers are acrylic acid ester copolymer of alcohol having 6 or less carbon atoms, polyacrylic acid, and ammonia-modified polyacrylic acid. The acrylic acid ester copolymer is a copolymer made from starting monomers containing an acrylic ester of alcohol having 6 or less carbon atoms and a monomer having a hydroxyl group in the molecule. The polyacrylic acid is usually a polymer containing acrylic acid and acrylic ester as starting monomers. The amount of the repellency preventive agent is usually 0.1–7 mass %, and preferably 0.2–5 mass % for 100 mass % of the primer polymer.

The primer composition can be prepared by mixing the above raw materials using a high speed mixer or homogenizer and homogeneously dissolving or dispersing the primers and other components. The viscosity of the primer composition determined by a Brookfield type viscometer is generally 50–800 mPa·s, preferably 70–500 mPa·s, and more preferably 80–300 mPa·s. If the viscosity is too low, the composition may run down the coated sheet making it difficult to produce a uniform coating. On the other hand, if the viscosity is too high, the coating operation may be difficult.

Although there are no specific limitations, the glass transition temperature (Tg) of the primer layer is usually 20–50° C. Tg in the present invention is determined from Tan δ which is measured using a dynamic viscoelasticity measurement apparatus under the conditions of a twist mode of shear rate=1 radian/sec, a temperature range of –60° C. to 100° C., and a rate of temperature rise of 5° C./sec. The thickness of samples was usually 1–2 mm.

Polycarbonate Polyurethane

Polycarbonate polyurethane is a polyurethane having a repeating unit derived from polycarbonate polyol in the molecule. Preferably, the polycarbonate polyurethane is a polymer obtained by polymerizing raw materials containing a polycarbonate polyol and a diisocyanate. A short chain diol such as neopentyl glycol, ethylene glycol, or propylene glycol may be added to the raw materials as a chain extender.

IPDI (isophorone diisocyanate), MDI (diphenylmethane diisocyanate), hydrogenated MDI; 1,6-hexanediol diisocyanate, TDI (tolylene diisocyanate), TMXDI (tetramethylxylylene diisocyanate), and the like may be used as the diisocyanate. The raw material may contain one or more polycarbonate polyols and one or more diisocyanates.

The alkylene carbon atom number of the polycarbonate polyol is preferably 4–8, and particularly preferably 5–7. If the carbon atom number is too large, the plasticizer resistance of the primer layer tends to decrease; if too small, on the other hand, the water resistance of the primer layer may decrease. The weight average molecular weight of the polyurethane is usually 20,000–1,000,000, but is not limited to this range.

When an aqueous solvent is used for the primer composition, the polyurethane is preferably a self-emulsification type polymer having an ionic hydrophilic functional group in the molecule. Such a polyurethane can homogeneously disperse in the solvent without using a surfactant, whereby the decrease in water resistance due to oozing of the surfactant on the surface of the primer layer can be effectively prevented.

The ionic functional group in the self-emulsification type polymer is preferably one or more groups selected from the group consisting of a sulfonate, carboxylate, phosphoric acid, betaine, sulfobetaine, sulfonium salt (e.g. $—S^+R_2.X^-$, wherein R is a methyl or hydrogen and X is a halogen ion), phosphonium salt ($—P^+R_3.X^-$, wherein R is a methyl or hydrogen and X is a halogen ion), and nitrogen-containing cationic functional group. The nitrogen-containing cationic functional group is one or more groups selected from the group consisting of an amine salt, quaternary ammonium salt (e.g. $—N^+R_3.X^{31}$, wherein R is methyl or hydrogen and X is a halogen ion), pyridinium salt (e.g. $—N^+C_5H_5.X^-$, wherein X is a halogen ion), and polyethylene polyamine (e.g. $—NH(C_2H_4NH)_mH$, wherein m is 2–4).

The self-emulsification type polyurethane usable in the present invention can be prepared in accordance with a conventional method of polyurethane synthesis. For example, such a polyurethane can be prepared by reacting polyisocyanate with a polyol mixture containing an ionic polyol having an ionic functional group and polycarbonate polyol. Another method is to directly incorporate a unit having an ionic functional group in the molecule of polycarbonate polyol.

The ionic polyol can be synthesized from aromatic dicarboxylic acid containing a sulfonate in the molecule (e.g. dimethyl sodium sulfoisophthalic acid) or aromatic dicarboxylic acid diester (e.g. dimethyl sodium sulfoisophthalate), for example. When the functional group is a quaternary ammonium group, polyurethane can be prepared by reacting (1) a mixture of a compound having an active hydrogen atom and a tertiary amino group in the molecule and a polyol and (2) a polyisocyanate to obtain a precursor polymer, then quaternarizing the tertiary amino group.

Bonded Structure

A bonded structure with excellent water resistance and plasticizer resistance can be obtained in the present invention by forming a primer layer on the surface of a base material using the above primer composition. Specifically, the bonded structure comprises (1) a bade material, (2) a primer layer containing the polycarbonate polyurethane sticking fast to said base material, and (3) an adhesive sheet having an adhesive layer stuck fast to said primer layer. Since the primer layer of the present invention exhibits superior plasticizer resistance, the primer layer is particularly useful in a bonded structure comprising a resin and a plasticized resin layer containing the resin and a plasticizer. In this instance, the primer layer is stuck fast to the plasticized resin layer.

A base material having a plasticization resin layer has been conventionally used as an interior decorative board. Such a conventional interior decorative board includes a base material having a plasticized resin layer as an outermost surface layer and a base material made from a resin containing a plasticizer. As examples of the interior decorative board, a PVC coated steel plate and a decorative board with the surface coated with an adhesive sheet containing a supporting body having a plasticized resin layer can be given. The PVC coated steel plate consists of a steel plate and a plasticized vinyl chloride resin layer covering the surface of the steel plate. The plasticizer is usually a plasticizer for polyvinyl chloride such as DOP (dioctyl phthalate). This type of decorative board is used for forming walls or floors in rooms where water is used such as a bathroom, kitchen, lavatory, and indoor pool. The primer layer of the present invention is used for adhering an adhesive sheet to the surface of the plasticizer resin layer of the decorative board.

An adhesive sheet conventionally used for interior finish work such as an ornamental sheet and decorative sheet can be used. Such a sheet has a supporting member and an adhesive layer secured to the supporting member, and is caused to adhere to the primer layer via the adhesive layer. A resin film containing a highly pliable resin is preferably used for the supporting member. Specifically, resins such as polyvinyl chloride resin, fluorine-containing resin, phthalate polyester (PET, PEN, etc.), acrylic resin, and polyolefin resin are used as the resin film material. Although there are no specific limitations to the thickness of the supporting member, the thickness is usually from about 10 to 800 μm. The supporting member may contain two or more layers inasmuch as the required pliability is not impaired. In addition, a metal foil such as an aluminum foil may be included to the extent that the pliability is not impaired.

Although not specifically limited, the adhesive layer of the adhesive sheet usually contains an acrylic polymer. Since the acrylic polymer possesses high hydrolysis resistance, this material is suitable for use by adhering to walls and the like of rooms where water is used. On the other hand, the acrylic adhesive layer has low plasticizer resistance. The primer layer of the present invention, therefore, can supplement the weak point of the acrylic adhesive layer and effectively prevent the decrease in the adhesive force due to a plasticizer and water, thereby increasing reliability of the bond structure.

The acrylic polymer contains a self-adherent polymer, for example. Preferably, the acrylic polymer contains an acrylic self-adherent polymer and a crosslinking agent which can crosslink the polymer. The self-adherent polymer is herein defined as a polymer exhibiting tackiness at an ordinary temperature (about 25° C.).

One example of the self-adherent acrylic polymer will now be described. First, an acrylic unsaturated acid (such as acrylic acid, methacrylic acid, itaconic acid, or maleic acid) or a polar (meth)acrylic monomer such as acrylonitrile is used as a first monomer. Then, a monomer mixture of the first monomer and an acrylic monomer, as a second monomer, is prepared. As the second monomer, an alkyl acrylate such as iso-octyl acrylate, butyl acrylate, 2-methylbutyl acrylate, 2-ethylhexyl acrylate, or isononyl acrylate can be used. The monomer mixture is synthesized into the self-adherent polymer with a prescribed molecular weight by a conventional polymerization method such as solution polymerization, emulsion polymerization, or mass polymerization.

The amount of the crosslinking agent for crosslinking the self-adherent polymer varies according to the type of the self-adherent polymer, but is usually 0.02–2 mass %, and preferably 0.03–1 mass % for 100 mass % of the self-adherent polymer. As the crosslinking agent, an isocyanate compound, melamine compound, poly(meth)acrylate compound, epoxy compound, amide compound, and bisamide compound such as a bisaziridine derivative of a dibasic acid (e.g. isophthaloylbis(2-methylaziridine can be used.

The glass transition temperature (Tg) of the adhesive layer is usually from −50° C. to 0° C., and preferably from −45° C. to −5° C. Tg of the adhesive layer is determined from Tan □ which is measured using a dynamic viscoelasticity measurement apparatus under the conditions of a twist mode of share rate=1 radian/sec, a temperature range of −60° C. to 100° C., and a rate of temperature rise of 5°/sec. The thickness of samples was usually 1–2 mm.

The thickness of the adhesive layer is usually 20–100 μm, and preferably 25–80 μm. The adhesive layer may contain additives such as a tackifier, minute elastic balls, minute tacky polymer balls, crystal polymers, inorganic powder, and UV absorbers insofar as the effect of the present invention is not impaired.

EXAMPLES

The present invention is described below in more detail by examples. However, the present invention is not limited the following examples.

Example 1

0.25 mass % of a repellency preventive agent (D-38, nonvolatile component concentration: 52%, manufactured by Dainichiseika Color & Chemicals Mfg. Co., Ltd.) was added to 100 mass % of a self-emulsification type water dispersible polycarbonate urethane resin solution (D6260, manufactured by Dainichiseika Color & Chemicals Mfg. Co., Ltd.). The mixture was homogeneously blended to obtain a primer composition of the present invention. The nonvolatile component concentration of the polycarbonate urethane resin solution was 20 mass %. The repellency preventive agent was a water soluble acrylic acid/n-butyl copolymer having hydroxyl groups in the molecule. The number average molecular weight of the copolymer (determined by GPC, styrene-reduced) was 2,100.

The primer composition was applied to the surface of a plasticized vinyl chloride resin layer of a PVC coated steel plate ("Hishimetal" manufactured by Mitsubishi Plastics Industries Ltd.) using a brush and allowed to stand for one hour in a room at about 25° C. and 65% RH to obtain a primer layer stuck fast to the vinyl chloride resin layer. The thickness of the primer layer was 6.5 μm. The vinyl chloride resin layer contained DOP as a plasticizer.

An adhesive sheet (an ornamental film "DI-NOC Film" manufactured by 3M Corp.) was adhered to the primer layer on the PVC coated steel and pressed with a 2 kg hand roller to form a bond structure of the present invention. The ornamental film had a supporting member of a vinyl chloride resin sheet and an adhesive layer containing acrylic tacky polymer secured on the back of the supporting member, with a plan dimension of 150 mm×25 mm.

The primer layer thus formed had a flat and smooth surface. No irregularities impairing the appearance were observed on the surface of the ornamental sheet adhered on the primer layer. The same polycarbonate urethane resin solution not containing the repellency preventive agent was applied to the surface of the PVC coated steel plate. The coated solution was repelled and a flat and smooth primer layer could not be formed.

Example 2

A primer layer was prepared in the same manner as in Example 1 except for using the polycarbonate urethane resin solution with a nonvolatile component concentration of 15 mass %. The bonded structure was prepared using this primer layer in the same manner as in Example 1. The thickness of the primer layer was 5 μm.

Comparative Example 1

A bonded structure was prepared in the same manner as in Example 1 except that the primer layer was not formed.

Comparative Example 2

A bonded structure was prepared in the same manner as in Example 1 except that a primer composition ("WP-3000" manufactured by 3M Company) containing an acrylic polymer as a primer polymer was used. This primer composition contained water as a solvent.

Comparative Example 3

A bonded structure was prepared in the same manner as in Example 1 except that a primer composition ("WP-2000" manufactured by 3M Company) containing chloroprene rubber as a primer polymer was used. This primer composition contained water as a solvent.

Comparative Example 4

A bonded structure was prepared in the same manner as in Example 1 except that a primer composition containing polyester polyurethane as a primer polymer was used.

Evaluation of Bonded Structures

The bonded structures obtained in the above examples were evaluated as follows. The evaluation results are shown in Table 1.

(1) Adhesive Force Under Ordinary Conditions

Bonded structures allowed to stand for two days in a room at about 25° C. and 65% RH after completion were used as samples. The adhesive force under ordinary conditions was determined by measuring peel strength when the samples were peeled at an angle of 180° at a drawing speed of 300 mm/min.

(2) Adhesive Force Under Heating

Bonded structures allowed to stand still for seven days in an oven at 65° C. after completion were used as samples. The adhesive force under heating was determined by measuring peel strength when the samples were peeled at an angle of 180° at a drawing speed of 300 mm/min.

(3) Water Resistance of Adhesive Force

The bonded structures were dipped in water at 40° C. for seven days. The water resistance of adhesive force was determined by measuring peel strength when the samples were peeled at an angle of 180° at a drawing speed of 300 mm/min.

TABLE 1

|  | Example | | Comparative Example | | | |
| --- | --- | --- | --- | --- | --- | --- |
|  | 1 | 2 | 1 | 2 | 3 | 4 |
| Adhesive force under ordinary conditions (N/25 mm) | 21 | 21 | 22 | 22 | 35 | 21 |
| Adhesive force under heating (N/25 mm) | 20 | 19 | 12 | 8 | 11 | 20 |
| Water resistance of adhesive force (N/25 mm) | 22 | 19 | 19 | 5 | 11 | 5 |

The plasticizer resistance of the primer layer can be evaluated from the results of the adhesive force in Table 1. Specifically, samples exhibiting almost no decrease in the adhesive force after heating are judged to possess excellent plasticizer resistance. In the evaluation of the water resistance of adhesive force, not only water but also surfactants in the primer layer are suspected to have affected the results. A surfactant with a comparatively low molecular weight was included in the primer compositions in Comparative Examples 2 and 3. Oozing of the surfactant on the surface from the inside of the primer layer is considered to be one reason for the decrease in the water resistance of adhesive force.

As described above, the plasticizer resistance and water resistance of the primer composition and bonded structure of the present invention can be effectively increased even if the primer layer is not cured.

What invention claimed is:

1. A bonded structure comprising:
    (1) a base material comprising a plasticizing resin layer containing a resin and a plasticizer for the resin,
    (2) a primer layer containing a polymer sticking fast to said plasticizing resin layer, the polymer contaning a polycarbonate polyurethane having a repeating unit derived from polycarbonate polyol in a molecule thereof, and
    (3) an adhesive sheet having an adhesive layer stuck fast to said primer layer;
    wherein the primer layer effectively prevents the plasticizer from migrating from the base material to the adhesive sheet.

2. The bonded structure of claim 1, wherein the primer layer exhibits plasticizer resistance without being cured.

3. The bonded structure of claim 1, wherein the primer layer comprises at least 70 mass percent polymer.

4. The bonded structure of claim 1, wherein the primer layer comprises at least 80 mass percent polymer.

5. The bonded structure of claim 1, wherein the adhesive layer comprises an acrylic polymer having low plasticizer resistance, and the primer layer prevents plasticizers present in the plasticizing resin layer from reaching the adhesive layer.

6. A bonded structure comprising:
    (1) a base material comprising a plasticizing resin layer containing a resin and a plasticizer for the resin,
    (2) a primer layer containing a polymer sticking fast to said plasticizing resin layer, the polymer containing a polycarbonate polyurethane having a repaling unit derived from polycarbonate polyol in a molecule thereof, wherein the primer layer has a thickness of 1 to 200 micrometers, and
    (3) an adhesive sheet having an adhesive layer stuck fast to said primer layer.

7. The bonded structure of claim 6, wherein the primer layer has a thickness of 2 to 100 micrometers.

8. The bonded structure of claim 6, wherein the adhesive layer has a thickness of 20 to 100 micrometers.

9. The bonded structure of claim 6, wherein the adhesive layer has a thickness of 25 to 80 micrometers.

10. A bonded structure comprising:
    (1) a base material comprising a plasticizing resin layer containing a resin and a plasticizer for the resin,
    (2) a primer layer containing a polymer sticking fast to said plasticizing resin layer, the polymer containing a polycarbonate polyurethane having a repeating unit derived from polycarbonate polyol in a molecule thereof, and (3) an adhesive sheet having an adhesive layer stuck fast to said primer layer, wherein the adhesive layer has a thickness of 20 to 100 micrometers.

11. The bonded structure of claim 10, wherein the adhesive layer has a thickness of 25 to 80 micrometers.

12. The bonded structure of claim 10, wherein the primer layer has a thickness of 1 to 200 micrometers.

13. The bonded structure of claim 10, wherein the primer layer has a thickness of 2 to 100 micrometers.

14. The bonded structure of claim 1, wherein the adhesive sheet further comprises a support member.

15. The bonded structure of claim 14, wherein the support member is a resin film.

16. The bonded structure of claim 14, wherein the support member is from about 10 to 800 micrometers thick.

* * * * *

UNITED STATES PATENT AND TRADEMARK OFFICE
CERTIFICATE OF CORRECTION

PATENT NO. : 7,199,183 B2
APPLICATION NO. : 10/517021
DATED : April 3, 2007
INVENTOR(S) : Takahide Okuyama It is certified that error appears in the above-identified patent and that said Letters Patent is hereby corrected as shown below:

Column 5,
Line 51 (approx.), Delete "MDI;" and insert -- MDI, --, therefor.

Column 6,
Line 15, Delete "—$N^+R_3.X^{31}$," and insert -- —$N^+R_3.X^-$, --, therefor.
Line 15, Before "methyl" insert -- a --.
Line 44, Delete "bade" and insert -- base --, therefor.

Column 8,
Line 6, Delete "share" and insert -- shear --, therefor.
Line 7, Delete "$5°$/sec." and insert -- $5°C.$/sec. --, therefor.

Column 10,
Line 23, In Claim 1, delete "contaning" and insert -- containing --, therefor.
Line 48, In Claim 6, Delete "repealing" and insert -- repeating --, therefor.

Signed and Sealed this

Third Day of July, 2007

JON W. DUDAS
*Director of the United States Patent and Trademark Office*